(12) United States Patent
Golden et al.

(10) Patent No.: US 7,221,913 B2
(45) Date of Patent: May 22, 2007

(54) EFFECTIVE TIME-OF-ARRIVAL ESTIMATION ALGORITHM FOR MULTIPATH ENVIRONMENT

(75) Inventors: Stuart A. Golden, San Diego, CA (US); Jong-Kae Fwu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 10/875,368

(22) Filed: Jun. 23, 2004

(65) Prior Publication Data

US 2005/0287956 A1    Dec. 29, 2005

(51) Int. Cl.
*H04B 17/00* (2006.01)
(52) U.S. Cl. .............. 455/67.16; 455/456.1; 455/456.2; 455/67.13; 455/63.1; 455/65; 370/347; 701/301; 701/213; 342/357.09; 342/357.1; 343/702
(58) Field of Classification Search ............. 455/456.1, 455/456.2, 404.2, 65, 63.1, 67.13, 67.16; 370/347
See application file for complete search history.

(56) References Cited

U.S. PATENT DOCUMENTS

| | | | |
|---|---|---|---|
| 5,583,869 A * | 12/1996 | Grube et al. ................ 370/347 |
| 5,890,068 A * | 3/1999 | Fattouche et al. ......... 455/456.2 |
| 6,201,499 B1 * | 3/2001 | Hawkes et al. ............. 342/387 |
| 6,526,283 B1 * | 2/2003 | Jang ........................ 455/456.5 |
| 6,665,333 B2 * | 12/2003 | McCrady et al. ........... 375/147 |
| 6,697,417 B2 * | 2/2004 | Fernandez-Corbaton et al. .......................... 375/147 |
| 6,757,545 B2 * | 6/2004 | Nowak et al. ........... 455/456.2 |
| 6,760,318 B1 * | 7/2004 | Bims ......................... 370/332 |
| 6,801,782 B2 * | 10/2004 | McCrady et al. ........... 455/517 |
| 6,813,501 B2 * | 11/2004 | Kinnunen et al. ....... 455/456.2 |
| 7,068,742 B2 * | 6/2006 | Yousef et al. ............... 375/343 |
| 7,069,025 B2 * | 6/2006 | Goren et al. ............. 455/456.2 |
| 7,095,813 B2 * | 8/2006 | Amerga et al. ............. 375/343 |

FOREIGN PATENT DOCUMENTS

WO    WO 01/65271 A1    9/2001

OTHER PUBLICATIONS

Riba J et al: "A Robust Multipath Mitigation Technique for time-of -arrival Estimation" VTC 2002-fall.2002 IEEE 56th Vehicular Technology Confrence Proceedings. Vancouver, Canada, Sep. 24-28, 2002, IEEE Vehicular Technology Confrence, New York, NY: IEEE, US, vol. vol. 1 of 4.Conf.56, Sep. 24, 2002, pp. 2263-2267,XP010608836 ISBN: 0-7803-7467-3 p. 2263-p. 2266.
PCT Written Opinion, PCT/US2005/019725 Mar. 6, 2005.

* cited by examiner

*Primary Examiner*—Marceau Milord
(74) *Attorney, Agent, or Firm*—Lanny L. Parker (57) ABSTRACT

An algorithm identifies a line-of-sight (LOS) signal that may be used to provide an effective time-of-arrival (TOA) estimation.

20 Claims, 5 Drawing Sheets

EFFECTIVE TIME-OF-ARRIVAL ESTIMATION ALGORITHM FOR MULTIPATH ENVIRONMENT

Within a communication system, a mobile communications device may be located using a Global Positioning System (GPS) receiver that takes positions and times from multiple satellites to accurately measure and determine distances. The mobile communications device compares its time with the time broadcast by at least 3 satellites whose positions are known and calculates its own position on the earth.

The GPS system depends on expensive atomic clocks in the GPS transmitters to generate the precision measurements. It would be desirable to have an alternative to the satellite based GPS system that provides accurate positioning measurements that may be used in a variety of environments.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are not in direct contact with each other, but yet still co-operate or interact with each other.

Figure 1:
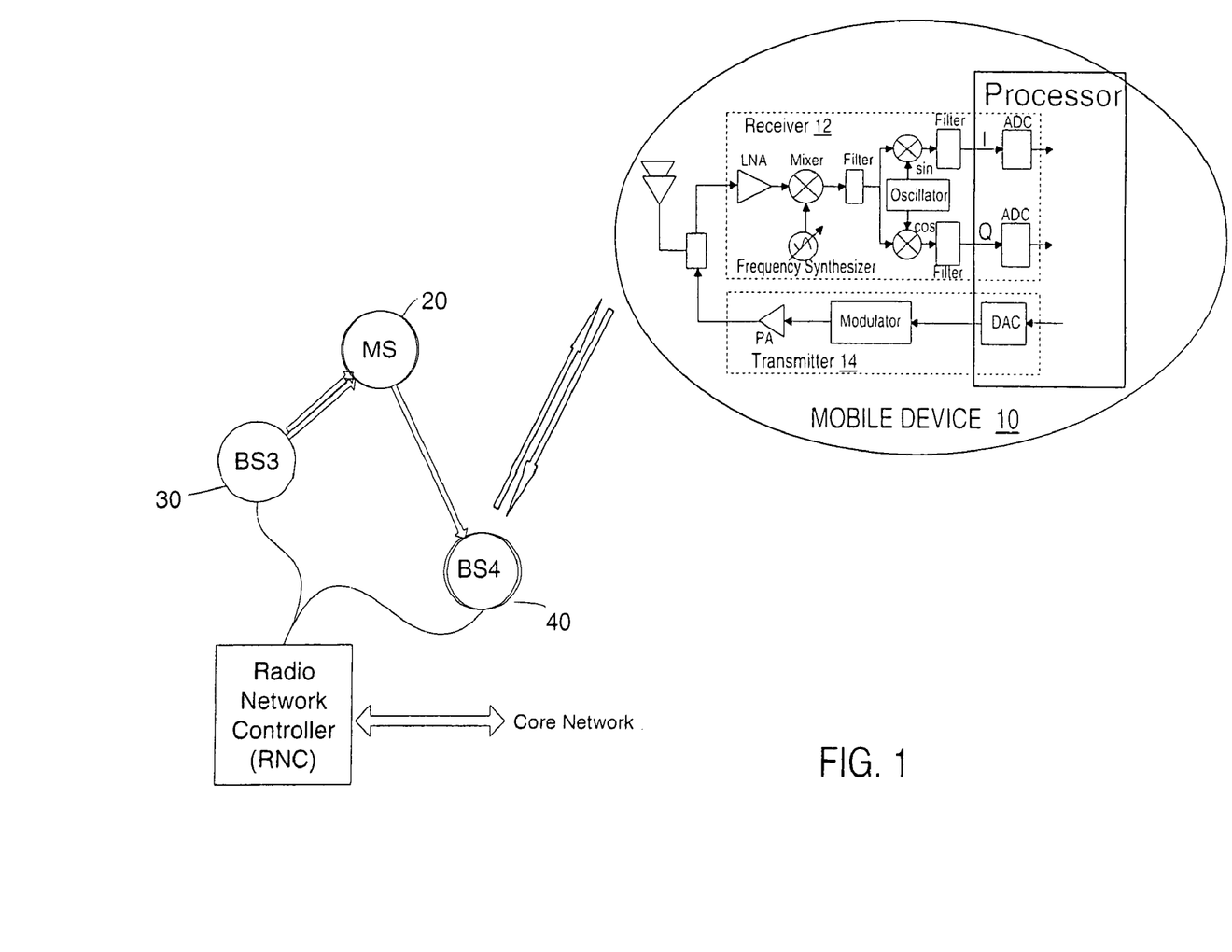
FIG. 1 illustrates a mobile wireless communications device operating in a network with other mobile devices in accordance with the present invention.

FIG. 1 illustrates a mobile wireless communications device 10 operating with other mobile devices in accordance with the present invention. As shown in the figure, the communication network may be a communication system with base stations to service multiple users within a coverage region. The multiple mobile devices may share a base station and employ a multiple access scheme such as a Code Division Multiple Access (CDMA) scheme. Wireless communications device 10 is shown communicating with base stations 30 and 40 and other mobile devices 20 in the network.

Embodiments may include packet exchanges between users of communication devices and access points in a Wireless Local Area Network (WLAN). For example, one or more mobile stations or an access point may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition. Note that the type of communication network and the type of multiple access employed by devices that emit RF signal energy are provided as examples only, and the various embodiments of the present invention are not limited to the embodiment shown in the figure.

Wireless communications device 10 includes a receiver 12 to receive a modulated signal from one or more antennas. The received modulated signal may be frequency down-converted, filtered, then converted to a baseband, digital signal. The frequency conversion may include Intermediate Frequency (IF) signals, but it should be noted that in an alternative embodiment the modulated RF signals may be directly down-converted without the use of IF mixers. The scope of the claims is intended to cover either embodiment of the receiver. The down converted signals may be converted to digital values by Analog-to-Digital Converters (ADCs).

Wireless communications device 10 further includes a transmitter 14 having a Digital-to-Analog Converter (DAC) that converts a digital value generated by the processor to an analog signal. The analog signal may be modulated, up-converted to RF frequencies and amplified using a power amplifier (with or without feedback control) to control the output power of the analog signal being transmitted from the antenna(s).

Although the present invention is shown in a wireless communications device 10, embodiments of the present invention may be used in a variety of applications. It should be pointed out that the timing acquisition embodiments are not limited to wireless communication devices and include wire-line communication devices. The present invention may be incorporated into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in smart phones, communicators and Personal Digital Assistants (PDAs), medical or biotech equipment, automotive safety and protective equipment, and automotive products. However, it should be understood that the scope of the present invention is not limited to these examples.

Figure 2:
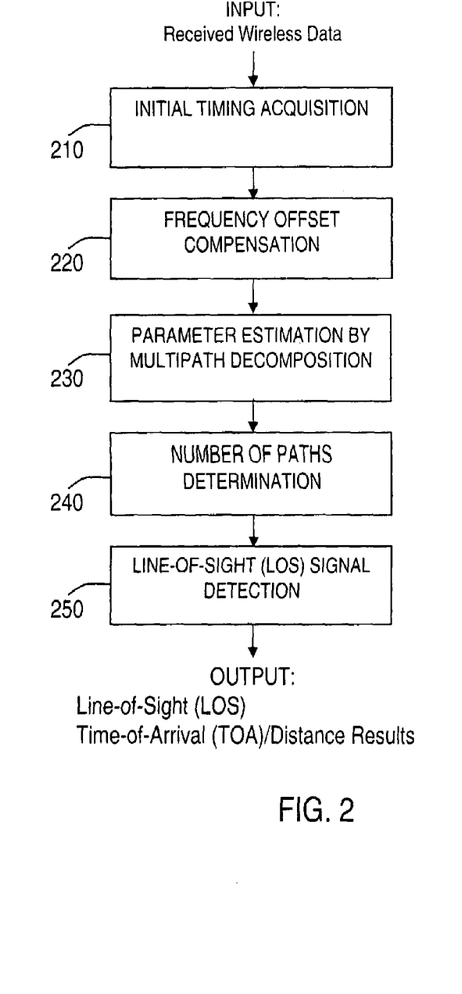
FIG. 2 is a flow diagram that illustrates features of the present invention to provide Line-of-Sight (LOS), distance results.

FIG. 2 is a flow diagram that illustrates features of the present invention in providing Line-of-Sight (LOS), Time-of-Arrival (TOA), distance results. The LOS signal is a signal ray transferred over a multipath channel that travels direct from transmitter to receiver, but note that the LOS signal may be interfered destructively by an indirect path signal. Accordingly, the LOS signal may be severely attenuated, especially in indoor applications due to obstructing objects. The described algorithm may be used to compute the distance for position location applications irrespective of whether wireless communications device 10 operates in a multipath environment and irrespective of whether the mobile device operates indoors or outdoors.

The algorithm to determine the Line-of-Sight, Time-of-Arrival, distance result includes a process 210 to provide an initial timing acquisition; a process 220 to provide frequency offset compensation; a process 230 that decomposes the received signal into components associated with various paths and provides parameter estimation by multipath decomposition; a process 240 to determine the number of paths in the received signal; and a process 250 to select the LOS signal. In some embodiments, the algorithm or portions thereof may be performed by a mobile station, a processor, or an electronic system. The algorithm is not limited by the particular type of apparatus, software element, or system performing the method. The various actions may be performed in the order presented, or may be performed in a different order and in some embodiments, some actions listed in FIG. 2 may be omitted.

Process 210 Initial Timing Acquisition

Process 210 provides an initial timing acquisition based on signals communicated between two RF devices such as two mobile devices, two base stations, one mobile device and one base station, or in general, any two wireless communication units having a transmitter and a receiver. By way of example, wireless communications device 10 may initiate transmission of a signal to another wireless device, but it should be pointed out that either of the two communication units may initiate a transmission sequence. It should also be noted that the two communication units may communicate synchronously or they may be unsynchronized, i.e., their clocks may differ by some fixed unknown time.

To estimate multipath signals, one solution is to estimate the parameters associated for all paths jointly, i.e., an optimal joint-estimation. However, this presents a non-linear multi-dimensional parameter estimation problem. Although efficient iterative solutions are readily obtainable, these solutions require a good initial estimate. The quality of the initial estimate significantly affects the algorithm performance, and therefore, the proposed iterative/sequential multipath estimation algorithm may be used to provide fast and accurate initial estimates for an optimal estimation algorithm that jointly estimates all of the multipath parameters simultaneously. By providing the simultaneous joint estimation algorithm with a fast and accurate initial estimate from the proposed sequential method, the performance and speed of the optimal estimation algorithm of the set of multipath parameters may be improved significantly.

The initial timing algorithm for initial coarse timing acquisition is robust to frequency variations, especially during the initial timing acquisition period when the frequency acquisition has not yet completed. Process 210 finds the initial coarse timing estimates by exploiting the periodic property of the preamble transmitted between electronic devices. The fast timing algorithm may be implemented in a recursive manner to provide significant computational efficiency. A second stage (finer accuracy) timing estimation scheme may be applied to refine the timing estimation at a later time. Due to its generic nature, this algorithm may be modified and applied to other communication systems to take advantage of similar periodic properties in the signal waveform.

Figure 3:
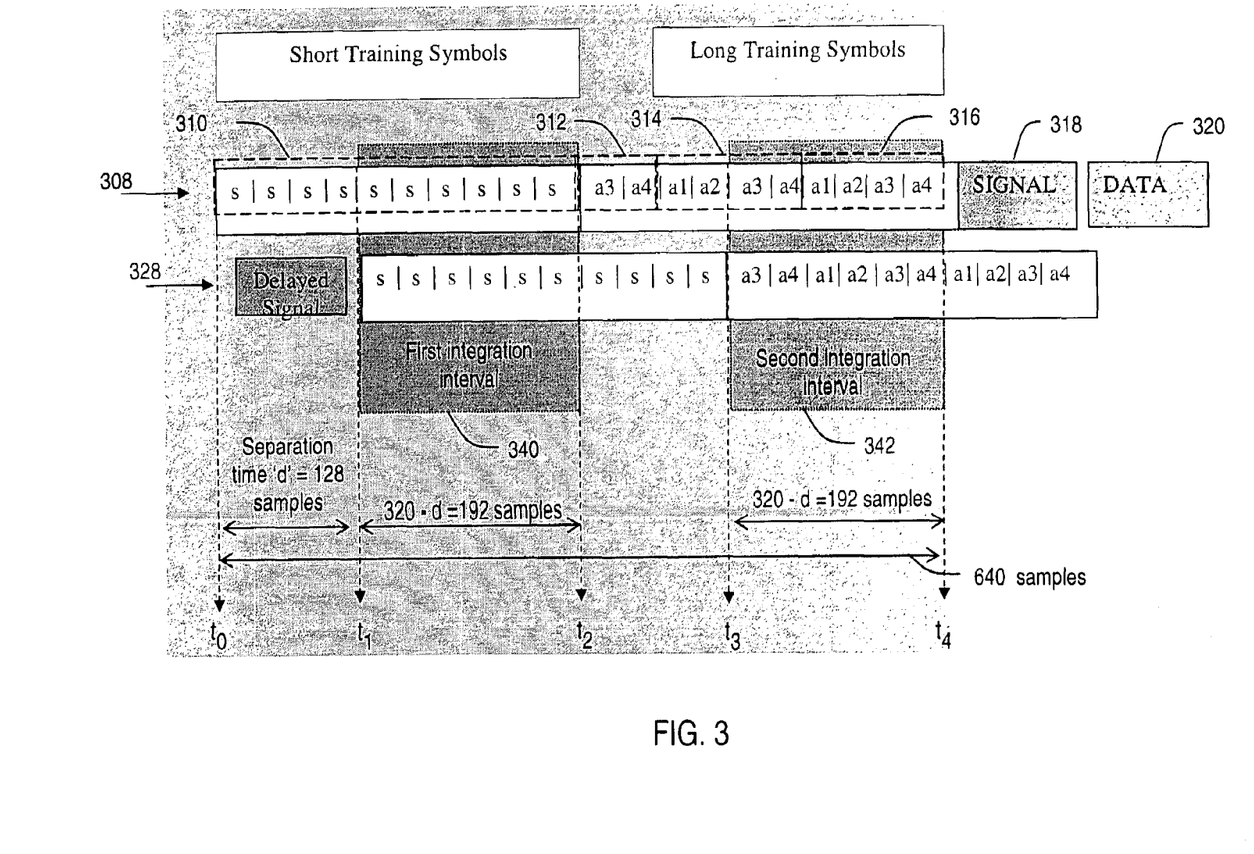
FIG. 3 illustrates a preamble format showing a received signal and a delayed version of the received signal.

FIG. 3 shows one example of a preamble format that may be used to illustrate the initial timing acquisition in process 210. The preamble format shows a received signal 308 and a delayed version of the received signal 328. In this embodiment the Orthogonal Frequency Division Multiplexing (OFDM) Physical Layer Convergence Protocol (PLCP) data unit includes the PLCP preamble, the OFDM SIGNAL 318 and a DATA field 320. The SIGNAL field 318, as part of the PLCP header, may contain a LENGTH field, a RATE field, a reserved bit and a parity bit, although the scope of the invention is not limited in this respect. The DATA field 320 may be variable length and contain a SERVICE field and PSDU data.

The preamble may consist of ten short training symbols 310, a prefix 312 and two long training symbols 314 and 316, but the claimed subject matter is not limited to this specific format. In other words, a preamble format having more or less than ten short training symbols and a preamble format having more or less than two long training symbols may be used in process 210. In this embodiment using the example of the 802.11a preamble format, the short training symbols 310 are shown in the figure as a repetition of ten 's', the two long training symbols 314 and 316 are each represented as ('a1|a2|a3|a4'), with the guard interval 312 represented as ('a3|a4'). Since the guard interval (GI2) is the circular prefix from the long symbol with duration 1.6 us, its content is denoted as ('a3|a4').

For the example of a sampling rate of 40 Msamples/second, each small segment of data labeled as 's', 'a1', 'a2', 'a3' or 'a4' represents a 0.8 us interval. Thus, the short training symbols 310 each have a symbol interval of 0.8 microsecond (us), the two long training symbols 314 and 316 each have a symbol interval of 3.2 us and the guard interval 312 has a symbol interval of 1.6 us. With the 40 Msamples/second sampling rate, note that 640 samples occur within the total preamble training interval of 16 us.

The signal in the short training symbol is a periodic signal having 32 samples in a period, and 320 samples occur in the 8 us interval of the short training symbols. The signals in the long training symbol are also periodic and have 128 samples, and 320 samples occur in the 8 us interval of the guard interval and the long training symbols. Note that the OFDM PHY provides the capability to transmit PSDU frames at multiple data rates for WLAN networks, and therefore, it is understood that adjustments for different sampling rates such as, for example, 20 Msamples/second, 60 Msamples/second, among other rates, may be made. In other words, other interval lengths of the short training symbols, the guard interval and the training symbols are anticipated.

Still referring to FIG. 3, a delayed version of the received signal 328 is delayed from the received signal 308. Given the periodic nature of the preamble, the auto-correlation function will have some pattern of peaking to a maximum value (local maximum or global maximum) by delaying a multiple of 32 samples (contributed from short symbol) or 128 samples (contributed from both the long symbols and the short symbols). In accordance with the present invention, the PLCP preamble is used for synchronization between the two electronic devices. The initial timing algorithm for initial coarse timing acquisition in process 210 convolves the received signal with the delayed version of the signal to find the frame boundary. The correlation is computed using the data within the moving integration interval.

The separation duration and integration interval may be chosen in accordance with several criteria, including using the largest amount of useful data to increase detection consistence; maximizing a cost function at the frame boundary to decrease the false-alarm rate and increase the detection robustness; and/or selecting a fast computation method and lower hardware cost. Note that the separation duration is greater than zero. i.e., a separation duration 'd' equal to zero is excluded in the timing acquisition since it is not contributed from the periodic pattern of the preamble signal.

A first embodiment is provided as an example to optimize the separation duration and integration interval for performance given the lower cost hardware/memory constraint. FIG. 3 illustrates a delayed signal 328 separated in time by a separation duration 'd' from the original receive signal 308. Given the periodic properties of the preamble and proper selection of the separation duration, the received signal 308 and the delayed signal 328 may be substantially identical within some integration interval. The effective integration interval between the original signal and delayed signal varies for different values of the separation duration 'd'. To achieve an optimal detection performance, the separation duration 'd' may be designed to maximize the integration interval to increase detection consistency. In other words, the separation duration 'd' may be selected such that a cost function c'[n] (described later and also referred to as a correlation function) is maximized at the frame boundary to decrease the false-alarm rate and increase the detection robustness.

The maximum effective integration interval may be obtained when the separation duration 'd' is chosen to be four times the period of the short symbol, i.e., 4 times 0.8 us=3.2 us, although the selection of this separation duration is not a limitation of the present invention. The separation duration 'd' is represented in the figure from time $t_0$ to time $t_1$, having 128 samples. As shown in this two integration interval example, the total integration interval is represented as six symbol periods from the short symbol 's' in integration interval 340 and six symbol periods from the long symbol a3,a4,a1,a2,a3,a4 in integration interval 342. Integration interval 340 is represented from time $t_1$ to time $t_2$, having 192 samples, and integration interval 342 is represented from time $t_3$ to time $t_4$, also having 192 samples. Note that the maximum integration interval within one preamble for a separation duration 'd' (except 'd'=0) may be set equal to twelve short symbol periods.

In operation, the selection of parameter values for the separation duration 'd' and the integration interval are important for the initial timing acquisition in process 210. In this example where the received signal and the delayed received signal are correlated, the initial timing algorithm may be expressed by computing the cost function c'[n] in the equation:

$$c'[n] = \left\| \sum_{i \in Window} r[n+i] \times r^*[n+i-d] \right\|, \forall n = 1, 2, \Lambda, n_{max}.$$

where r is the received baseband signal,
n is the number of data samples,
r* is the conjugate of r, and
d is the separation duration.

For the present example at 40 Msamples/sec, the correlation function may be computed where the separation duration 'd' equals 128 samples. The correlation function c'[n] may be computed over an integration interval 340 having 192 samples and the result compared against a threshold value. If the cost function c'[n1] has a value greater than a predetermined threshold value, then the initial frame boundary has been determined at n=n1. Thus, the periodic data segment has been determined using integration interval 340 in the short symbols.

If the detection of the frame boundary is determined, then verification of the frame boundary may continue using the long symbols in integration interval 342. The correlation function c'[n] may be computed for 'n' equal to (n1+1); 'n' equal to (n1+2), and 'n' equal to (n1+W), where W is an offset between the short symbol and the long symbol. If the correlation function c'[n1+W] is evaluated to have a value greater than the threshold value, the already found frame boundary is verified. Thus, finding the periodic data segment within the long symbol that follows the short symbol verifies the frame boundary. For the 40 Msamples/sec example, the offset W having a value of ((10×32)+1) equals 321 samples, which is approximately equal to 8 us. Note that one extra sample is introduced by concatenating the short symbol and the long symbol.

The short symbol data in the first integration interval 340 is used for the initial detection of the frame boundary. Alternatively, the algorithm to provide the initial timing acquisition in process 210 may be modified to use both integration interval 340 and integration interval 342. The long symbol data in the integration interval 342 may be used to verify the initial detection of the frame boundary, and thus, increase detection reliability. Also, the long symbol may be used when the initial operation of the modem has a higher false alarm rate when detecting frame boundaries. Further, Instead of using a threshold value for detection, the algorithm may be evaluated using first integration interval 340 along with second integration interval 342 to find the maximum value of the frame boundary.

A second embodiment is provided that optimizes the separation duration 'd' and the integration interval for optimal performance. To achieve the improved performance, a two stage detection of the frame boundary may be used. The first stage includes an initial timing acquisition that only uses short symbols along with a shortened separation duration 'd' of 32 samples (40 Msamples/sec rate), for example. The correlation function or cost function C'[n] is computed over an integration interval that includes 288 samples (320 samples–d equals 288 samples). The computed result of C'[n] may then be compared against a threshold value. If at n=n1 the cost function C'[n1] has a value greater than a predetermined threshold value, then the initial frame boundary has been determined at n=n1. Thus, the periodic data segment has been determined using integration interval 340 in the short symbols.

The maximum integration interval within the short preamble is when the separation duration 'd' equals one short symbol duration, i.e. 0.8 us. Again, in the 40 Msample/sec example, the separation duration 'd' is equivalent to 32 samples. Once the separation duration 'd' is selected, the integration interval 340 is selected to include the largest amount of useful data. In this case, the maximum integration interval within the short preamble is equal to nine short symbol periods. The integration interval is equivalent to 288 samples (32 samples per short symbol times 9 short symbols).

Again, in this embodiment the first stage initial timing acquisition in short symbol is used for the initial detection of the frame boundary, and the second stage detection is used to verify the initial detection. The second stage uses both short symbols and long symbols, again with a separation duration 'd' of 128 samples and integration intervals 340 and 342 having 192 samples for the 40 Msamples/sec example. Thus, the second stage detection is shown in FIG. 3 using both the short symbols and the long symbols with a separation duration 'd' that equals 4 short symbols. This method allows a low threshold on the first detection algorithm so that packets are not missed. A high threshold on the second stage reduces the number of false alarms and improves the detection reliability. Alternately, instead of using a separation duration 'd' that equals four short symbols, one long symbol may be used since four short symbols is equal to one long symbol.

Figure 4:
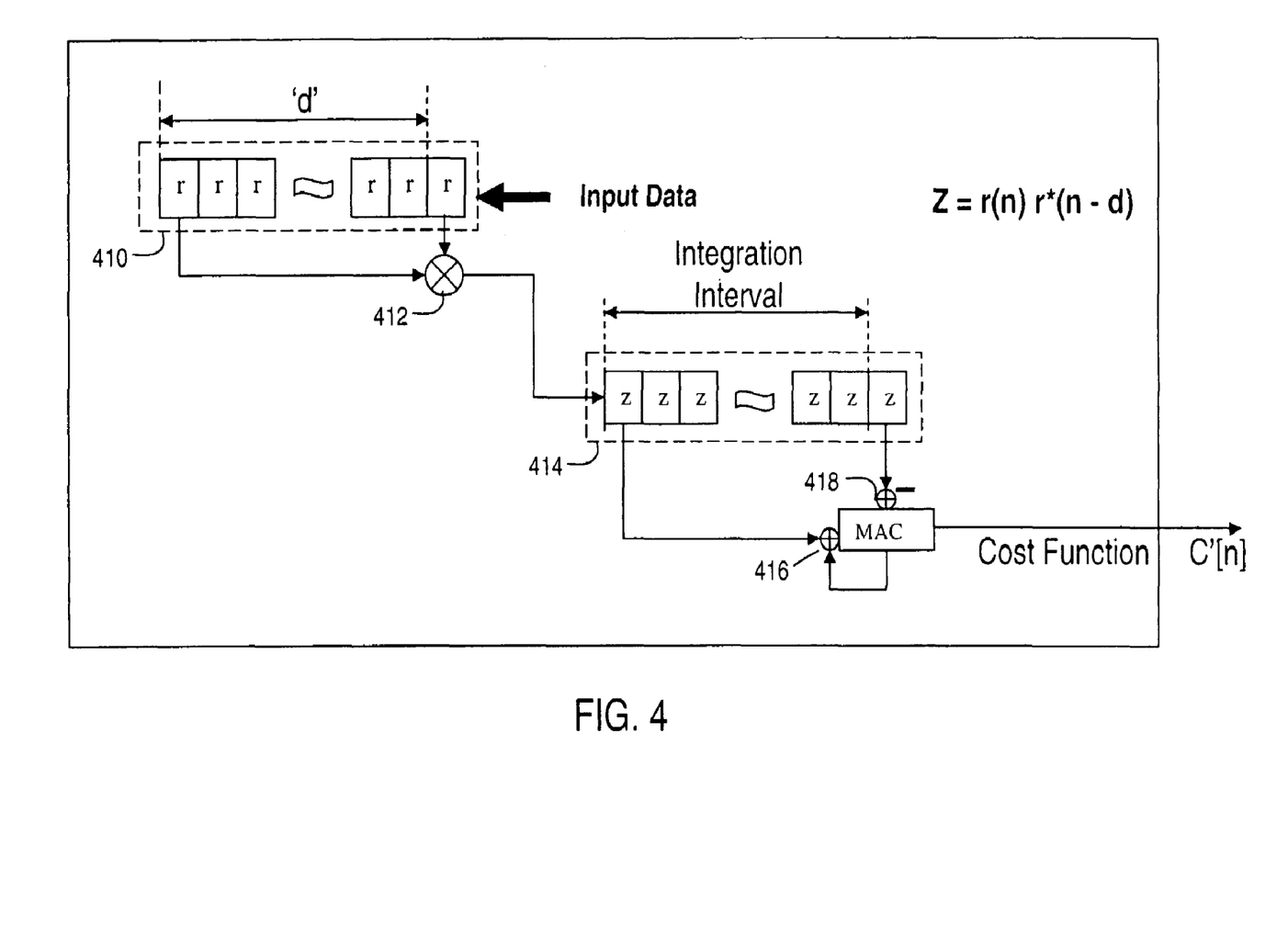
FIG. 4 is a diagram showing one embodiment of hardware blocks that may be used to implement the cost function.

FIG. 4 is a diagram showing one embodiment of hardware blocks 400 that may be used to implement the cost function c'[n1]. A shift register 410 receives an input data stream, shifting the data into N storage cells, where N is of a sufficient length to capture data corresponding to the separation duration 'd' plus one additional storage cell. The length of shift register 410 allows the received signal to be convolved by multiplier 412 with the delayed version of the signal. Briefly referring to FIG. 3, the received signal 308 is the input data in the hardware blocks of FIG. 4. Shift register 410 is of sufficient length to capture at least one bit of the delayed version of the received signal 328. Shift register 414 receives the multiplied data bit from multiplier 412 and shifts that data into the first of M storage cells, where M is of a sufficient length to capture and store data over the selected length of the integration interval, plus one additional storage cell. A multiplier 416 provides a multiply/accumulate function of the data during the integration interval, while a multiplier 418 subtracts or removes data that has passed out of the window defined by the integration interval. Thus, correlation is computed by the hardware blocks 400 using the data within the moving integration interval. The output of the MAC (multipliers 416 and 418) is the cost function C'[n].

The timing acquisition method described in FIGS. 3 and 4 utilizes the periodic property of the preamble waveform and does not need to be frequency synchronized. The algorithm provides a mechanism for initial coarse timing acquisition, providing significantly faster computation and the advantage of not being sensitive to frequency mismatches between the transmitter and the receiver. Due to its generic nature, the scheme may be modified and applied to other communication systems.

FIGS. 3 and 4 illustrate an initial timing acquisition based on signals communicated between two RF devices. The described initial timing algorithm for initial coarse timing acquisition exploits the periodic property of the preamble transmitted between the electronic devices, however, it should be pointed out that other methods of acquiring an initial timing acquisition may be employed. Now returning to FIG. 2 and continuing with Process 220.

Process 220 Frequency Offset Compensation

In process 220 a frequency offset compensation value is calculated to correct the frequency offset between the received signal and the reference signal, i.e., the signal from the remote modem. Signals are sensitive to carrier frequency offset between the transmitter and the receiver local oscillators, which may cause self interference, for example, between the subchannels, i.e. modulated subcarriers in an OFDM modulation format. Carrier frequency offset between transmitter and receiver local oscillators may be estimated and compensated at the receiver.

Let $y_n$ be the discrete sampled received data and $s_n$ be the reference data at discrete time n. The relationship between the received signal and the reference signal may be represented as:

$$y_n = A_1 s_{n-\tau_1} \times \exp(j\omega n) + e_n,$$

where $A_1$ is the signal amplitude, $\tau_1$ is the delay taken to the nearest sample, $\omega$ is the frequency offset between the received signal and the reference signal, and $e_n$ is the noise sampled at time n.

To estimate the frequency offset, the following least-square cost function is minimized:

$$(\hat{A}, \hat{\omega}) = \min_{(A,\omega)} \|y_n - As_n \times \exp(j\omega n)\|^2,$$

where ($\hat{A}$, $\hat{\omega}$) represent "estimated values" for amplitude and frequency offset.

The cross-product $z_n = y_n s_n^*$ can be defined. Note that the value for $z_n$ does not have to be recomputed for each hypothesized frequency value that is used. The estimated amplitude is given by:

$$\hat{A} = \frac{\sum z_n \exp(-j\omega n)}{\sum |s_n|^2},$$

and the estimated frequency offset may be obtained by a searching algorithm using:

$$\hat{\omega} = \arg \min_\omega \Sigma |y_n|^2 - |\hat{A}|^2 \Sigma |s_n|^2.$$

The estimated frequency offset is then applied to the received signal for frequency offset correction.

Process 230 Parameter Estimation by Multipath Decomposition

Once the frequency offset is compensated, the TOA estimation for multipath signals does not directly estimate the LOS signal alone. Instead, the algorithm estimates the multipath signals (both LOS and non-LOS) and uses specific properties observed in the signals to select the LOS signal. Also, instead of estimating all of the multipath signals concurrently, the described method estimates the dominant multipath component sequentially to achieve a fast solution.

Process 230 determines parameter estimation by multipath decomposition. Wireless communication devices typically operate over a channel that has more than one path from the transmitter to the receiver, often referred to as a multipath channel. The various paths traveled by these signals can be caused by reflections from buildings, objects, or refraction. Accordingly, the signals received at the receiver have different attenuations and time delays that correspond to the signal's travel path. Process 230 decomposes the received signal into components associated with the various paths and provides parameter estimation by multipath decomposition.

The decomposition algorithm associated with process 230 sequentially estimates multipaths based on the energy ratio of the signal component and the noise component (ESNR). With the ESNR generated for each of the multipath signals, the decomposition algorithm arranges the signal components from the strongest ESNR to the weakest ESNR. Since a low ESNR may result in poor estimation performance using the TOA information, the decomposition algorithm executed in process 230 accounts for low ESNR issues in accordance with the present invention. Accordingly, the attenuated receive signals obstructed by objects and/or the non-LOS signal energy/power that is substantially greater than that of the LOS signal is accounted for in process 230.

In the decomposition algorithm, $\hat{y}_i(t)$ represents the signal used for estimating the i-th path component. During the decomposition process for the i-th path, the strongest signal $\hat{y}_i(t)$ is estimated and removed from the residual signals.

The estimation problem is formulated by an iterative process with first letting r(t)=y(t), then $$(\hat{A}_i, \hat{\tau}_i) = \min_{(\hat{A}_i, \hat{\tau}_i)} \int_t \|r(t) - A_i s(t - \tau_i)\|^2,$$

The final estimate becomes:

$$Z(\omega) = r(\omega) * S^*(\omega)$$

$$\hat{A} = \frac{\sum_\omega |Z(\omega)\exp(-j\omega\tau_i)|^2}{\sum_\omega |S(\omega)|^2},$$

Where $\hat{\tau}_i = \arg\min_\tau \sum_\omega |r_{(\omega)}|^2 - |\hat{A}_i|^2 \sum_\omega |S(\omega)\|^2$.

Again, note that Z(107) is only computed once per minimization. Note that the iteration is repeated with:

$r(t)=r(t)-\hat{A}_i * s(t-\hat{\tau}_i)$.

The decomposition algorithm associated with process 230 may be generalized to an M-path example without a specific signal strength relationship between paths. The determination of the number of paths M, and the selection of the LOS signal is illustrated in preparation for the final estimation of TOA for the LOS signal. Let A1>A2>A3 ..., and by way of example, assume that the LOS signal is the third strongest signal, i.e., $y_{LOS}(t)=A_3 s(t-\tau_3)$ In this example the LOS signal has a smaller ESNR than either of the two other non-LOS paths.

The mechanism for selecting the number of paths M and the LOS signal is described later, but assume that these parameters are known. The decomposition algorithm first estimates the strongest signal component $y_1(t)=A_1 s(t-\tau_1)$ and stores the information. The value $\hat{y}_1(t)$ is removed from y(t) and the remaining signal becomes residual error r(t)=y(t)-$\hat{y}_1$(t). After separating the $\hat{y}_1$(t) from the received signal y(t), the second strongest signal component $y_2$(t) is then estimated from r(t). The same procedure is repeated for the i-th path until i=M. The time-of-arrival information $\tau_{LOS}$ is obtained from $\hat{y}_{LOS}(t)=\hat{A}_{LOS}s(t-\hat{\tau}_{LOS})$, where LOS=3 in this example.

Figure 5:
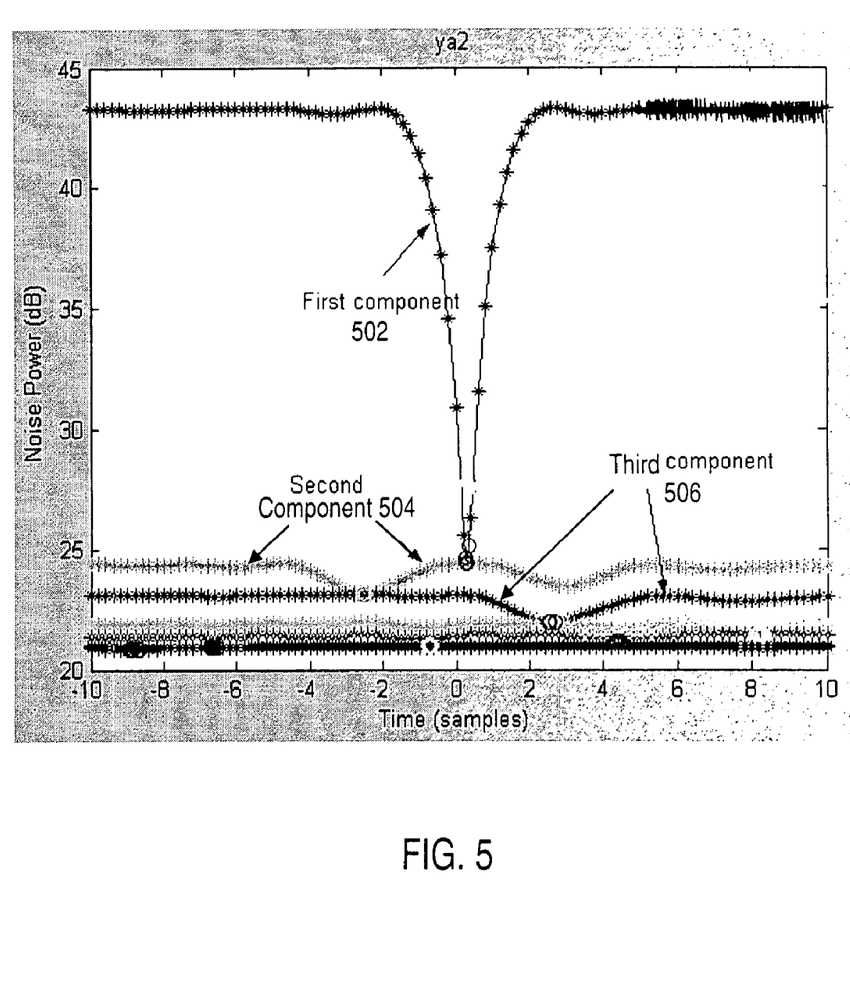
FIG. 5 is a diagram of noise power used in determining the number of paths for channel signals using residual error techniques.

FIG. 5 illustrates a residual signal/noise power plot for several path components. The Y-axis represents the residual signal/noise power and the X-axis represents the estimated delay $\tau_i$ associated with an i-th path. During the decomposition process, the ESNR is estimated for each of the component signals and the strongest signal $\hat{y}_i$(t) at a time is determined and removed from the residual error. Note that the residual signal/noise decreases as the number of paths increases. In the example illustrated in FIG. 5, the first component 502 is shown as the strongest path among the M-path signals, second component 504 the next strongest path, followed by third component 506.

As previously stated, the decomposition algorithm associated with process 430 sequentially estimates multipaths based on ESNR. As shown in FIG. 5, first component 502 has the strongest ESNR and in accordance with the decomposition algorithm is selected for removal. Following the removal of first component 502, the residual noise of the remaining components is significantly lower. Note that the residual noise of the remaining components is about 20 dB lower after removing the first path signal.

Process 230 continues (FIG. 2), sequentially estimating the remaining multipaths based on ESNR. In this example, the second component 504 is the remaining multipath signal having the strongest ESNR. This second path signal (second component 504) is then removed and the residual noise of the remaining components further drops by a few dB. As shown in the figure, the third component 506 is the component selected from the remaining components as having the strongest ESNR. After removing the third component 506, the residual noise of the remaining components drops an additional few dB.

Now returning to FIG. 2 and continuing with Process 240.

Process 240 Number of Paths Determination

In process 240 the number of paths in the received signal that affect the residual signal is determined. Continuing with the example, the residual noise power for the remaining components is relatively flat which shows that there is no clear effect on removing any other multipath component on the residual signal. Thus, a threshold in the residual noise power or a residual change limit may be used to determine the number of paths in the received signal. In this example, three paths have been shown to affect the final residual noise power. Selecting additional components and removing them would not significantly reduce the residual signal, and therefore, the number of effective multipath is determined to be three, i.e., M=3.

Process 250 LOS Signal Detection

In process 250 the LOS signal may be determined from among the various multipath components. With the number of paths M previously determined, the distance for each path may be computed and a distance calculated and assigned to the LOS signal. At first glance the possible number of combinations for the distance computation is M×M=M². However, a symmetric property between the forward and reverse link may be used to reduce the possible number of candidates in the multipath environment. For instance, the M paths in the forward link may be associated with an equal number of paths in the reverse link. Put another way, signal travel from mobile device 10 to base station 40 (see FIG. 1) may be considered as having similar properties compared to the signal travel from base station 40 to mobile device 10. The signal component having the strongest signal power in the forward link may be associated with, and paired with, the strongest path in the reverse link. Utilizing this symmetric property, the possible number of combinations for the distance calculation may be significantly reduced, from M² combinations to M combinations. The distance for each of the M possible candidates may be computed.

The signal component determined to have a distance greater than the strongest component is eliminated from the LOS candidate list. The elimination is based on the LOS signal received via the direct path having a shorter path than signals received via any other path. The LOS signal has the smallest delay among all paths. Also, the strongest path signal parameter estimation (amplitude and delay) is more accurate than other paths since it has the highest ESNR.

Note that any path having a negative distance may be disregarded as not having real physical meaning. The negative distance may arise because of a condition caused by over-modeling and/or noise. That component associated with the negative distance should be eliminated from the LOS candidate list. Another criteria that may be enforced is that temporal information should not change dramatically. Limits may be placed on the allowed changes between consecutive computations, noting that the distance between differential consecutive trials should change in a controlled manner.

By now it should be apparent that an algorithm has been presented that identifies a line-of-sight (LOS) signal, and then provides an effective time-of-arrival (TOA) estimation. The algorithm allows an accurate, fast initial timing acquisition; compensates the frequency offset before performing multipath estimation; estimates the multipath signals by the proposed decomposition method; determines the number of effective paths in the multipath environment; computes the distance using TOA information; and selects the distance associated with the LOS signal. Once the LOS signal is determined, the precision location feature may be implemented using multiple distance measurements from the proposed algorithms.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method, comprising:
using multipath decomposition to determine time-of-arrival in a radio device without synchronized hardware;
estimating a signal having a strongest noise component (ESNR) in the multipath decomposition; and
removing the signal having the strongest ESNR from residual signals.

2. The method of claim 1 further comprising:
sequentially estimating multipaths based on an energy ratio of a signal component and a noise component (ESNR).

3. The method of claim 2 further comprising:
using the sequentially estimated multipaths as initial estimates to improve performance and speed of an optimal joint estimation algorithm for a set of multipath parameters.

4. The method of claim 2 further comprising:
arranging the components from a strongest ESNR to a weakest ESNR.

5. The method of claim 1 further including:
using frequency offset compensation to improve accuracy in estimating time-of-arrival.

6. The method of claim 5 wherein using frequency offset compensation includes minimizing a least-square cost function.

7. The method of claim 6, further including:
applying the frequency offset to the received signal for frequency offset correction.

8. A method, comprising:
sequentially estimating a dominant multipath component to achieve a time-of-arrival estimation of a received signal;
using multipath decomposition to estimate multipaths based on an energy ratio of a signal component and a noise component (ESNR); and
arranging signal components from a strongest ESNR to a weakest ESNR.

9. The method of claim 8 further comprising:
estimating the strongest signal in the multipath decomposition to facilitate removing a signal component with the strongest ESNR from residual signals.

10. The method of claim 9, further comprising:
estimating a next strongest signal in the multipath decomposition and determining if the residual signal is reduced by removing the next strongest signal.

11. The method of claim 10, further comprising:
determining a number of paths in the multipath signal by sequentially removing components to reduce the residual signal.

12. The method of claim 11, wherein the number of paths is determined when the residual signal is not reduced by the removal of a next strongest signal in the multipath decomposition.

13. A method, comprising:
determining an initial timing acquisition based on a received signal;
providing a frequency offset compensation to correct a frequency offset between the received signal and a reference signal;
decomposing the received signal into components associated with various paths by using multipath decomposition to estimate multipaths based on an energy ratio of a signal component and a noise component (ESNR) and arranging signal components from a strongest ESNR to a weakest ESNR;
determining the number of paths in the received signal; and
selecting one of the number of paths as a line-of-sight signal.

14. The method of claim 13 wherein determining the number of paths in the received signal further includes:
selecting additional components and removing them to reduce the residual signal, wherein the number of paths is determined when removing an addition component does not substantially reduce the residual signal.

15. The method of claim 11 wherein selecting one of the number of paths as a line-of-sight signal further comprises using the line-of-sight signal to determine distance results.

16. A method of determining distance in a radio device, comprising:
receiving a modulated signal in a multi-antenna receiver that is converted to a received signal;
using the received signal in a processor to decompose multipaths based on an energy ratio of a signal component and a noise component (ESNR);
arranging components from a strongest ESNR to a weakest ESNR; and
removing component with the strongest ESNR from residual signals.

17. The method of claim 16 further including:
using frequency offset compensation, multipath decomposition, number of paths determination and line-of-sight signal determination to determine a line-of-sight signal used for time-of-arrival in the radio device.

18. The method of claim 16 further including:
using a symmetric property between a forward and a reverse link to reduce a possible number of candidates in the multipath.

19. The method of claim 16 further including:
eliminating a signal component determined to have a distance greater than a strongest component from a line-of-sight candidate list.

20. The method of claim 16 further including:
placing limits on allowed changes between consecutive computations to change distance between differential consecutive trials.

* * * * *